US008949560B1

(12) United States Patent
Blitzer et al.

(10) Patent No.: US 8,949,560 B1
(45) Date of Patent: Feb. 3, 2015

(54) VALIDATING AN ABILITY TO ROLL BACK DATA TO AN EARLIER POINT IN TIME FOR DATA ASSOCIATED WITH A VIRTUAL STORE

(75) Inventors: Aharon Blitzer, Shoham (IL); Aviram Katz, Kiryat Onno (IL); Amit Lieberman, Raanana (IL); Roy Dahan, Ashdod (IL); Roy Michael, Modiin (IL)

(73) Assignee: EMC Corporation, Hopkinton, MA (US)

( * ) Notice: Subject to any disclaimer, the term of this patent is extended or adjusted under 35 U.S.C. 154(b) by 695 days.

(21) Appl. No.: 13/311,590

(22) Filed: Dec. 6, 2011

(51) Int. Cl.
*G06F 13/00* (2006.01)

(52) U.S. Cl.
USPC .................................. 711/162; 711/E12.103

(58) Field of Classification Search
None
See application file for complete search history.

(56) References Cited

U.S. PATENT DOCUMENTS

| | | | | |
|---|---|---|---|---|
| 8,032,488 | B2 * | 10/2011 | Lashley et al. | 707/613 |
| 2008/0256142 | A1 * | 10/2008 | Wakefield | 707/203 |
| 2009/0044046 | A1 * | 2/2009 | Yamasaki | 714/6 |
| 2009/0172046 | A1 * | 7/2009 | Kodama et al. | 707/204 |
| 2009/0182963 | A1 * | 7/2009 | Prahlad et al. | 711/162 |
| 2009/0240748 | A1 * | 9/2009 | Prahlad et al. | 707/204 |
| 2009/0240975 | A1 * | 9/2009 | Shitomi et al. | 714/5 |
| 2010/0281458 | A1 * | 11/2010 | Paladino et al. | 717/106 |
| 2010/0287141 | A1 * | 11/2010 | Prahlad et al. | 707/645 |
| 2011/0066599 | A1 * | 3/2011 | Prahlad et al. | 707/679 |
| 2011/0231701 | A1 * | 9/2011 | Aoki | 714/15 |
| 2011/0264620 | A1 * | 10/2011 | Prahlad et al. | 707/609 |
| 2011/0307736 | A1 * | 12/2011 | George et al. | 714/6.2 |
| 2012/0151250 | A1 * | 6/2012 | Saika | 714/4.11 |
| 2013/0290985 | A1 * | 10/2013 | Walsh | 719/318 |

* cited by examiner

*Primary Examiner* — Sean D Rossiter
(74) *Attorney, Agent, or Firm* — Daly, Crowley, Mofford & Durkee, LLP

(57) ABSTRACT

In one aspect, a method includes obtaining data on components of a virtualization server comprising acquiring a mapping of virtual disks in a virtual store to storage disks, obtaining data on components of a storage array comprising acquiring a mapping of logical units in the storage array to the storage disks, the logical units replicating data from a corresponding storage disk, correlating each virtual disk to a logical unit based on the mapping of the virtual disks to the storage disks and the mapping of the logical units to the storage disks, retrieving replication data of the logical units from the storage arrays and, for a selected virtual store, checking that the selected virtual store has a replica for all the required storage disks mapped to the virtual disks of the selected virtual store.

19 Claims, 3 Drawing Sheets

VALIDATING AN ABILITY TO ROLL BACK DATA TO AN EARLIER POINT IN TIME FOR DATA ASSOCIATED WITH A VIRTUAL STORE

BACKGROUND

In a data protection system, data is stored by a host onto a primary storage disk. The data on the storage disk is also replicated on a secondary storage device. Sometime the data that is stored on the primary storage device becomes corrupted. Using the secondary storage device, the data protection system rolls back to a point in time when the data was not corrupted.

SUMMARY

In one aspect, a method includes obtaining data on components of a virtualization server comprising acquiring a mapping of virtual disks in a virtual store to storage disks, obtaining data on components of a storage array comprising acquiring a mapping of logical units in the storage array to the storage disks, the logical units replicating data from a corresponding storage disk, correlating each virtual disk to a logical unit based on the mapping of the virtual disks to the storage disks and the mapping of the logical units to the storage disks, retrieving replication data of the logical units from the storage arrays and, for a selected virtual store, checking that the selected virtual store has a replica for all the required storage disks mapped to the virtual disks of the selected virtual store.

In another aspect, an article includes a non-transitory machine-readable medium that stores executable instructions. The instructions causing a machine to obtain data on components of a virtualization server comprising acquiring a mapping of virtual disks in a virtual store to storage disks; obtain data on components of a storage array comprising acquiring a mapping of logical units in the storage array to the storage disks, the logical units replicating data from a corresponding storage disk; correlate each virtual disk to a logical unit based on the mapping of the virtual disks to the storage disks and the mapping of the logical units to the storage disks; retrieve replication data of the logical units from the storage arrays; and, for a selected virtual store, check that the selected virtual store has a replica for all the required storage disks mapped to the virtual disks of the selected virtual store.

In a further aspect, an apparatus includes circuitry to obtain data on components of a virtualization server comprising acquiring a mapping of virtual disks in a virtual store to storage disks; obtain data on components of a storage array comprising acquiring a mapping of logical units in the storage array to the storage disks, the logical units replicating data from a corresponding storage disk; correlate each virtual disk to a logical unit based on the mapping of the virtual disks to the storage disks and the mapping of the logical units to the storage disks; retrieve replication data of the logical units from the storage arrays; and, for a selected virtual store, check that the selected virtual store has a replica for all the required storage disks mapped to the virtual disks of the selected virtual store.

DETAILED DESCRIPTION

When a device saves data to a virtual disk, it is unaware of the physical location the data is actually being stored. This uncertainty makes it difficult for data protection systems to rollback data when virtual disks are involved. Described herein is an approach that verifies the ability to rollback data to an earlier point in time for data associated with a virtual disk. In one particular example, a user will be able to determine whether a virtual store can be rolled back to particular point in time.

Figure 1:
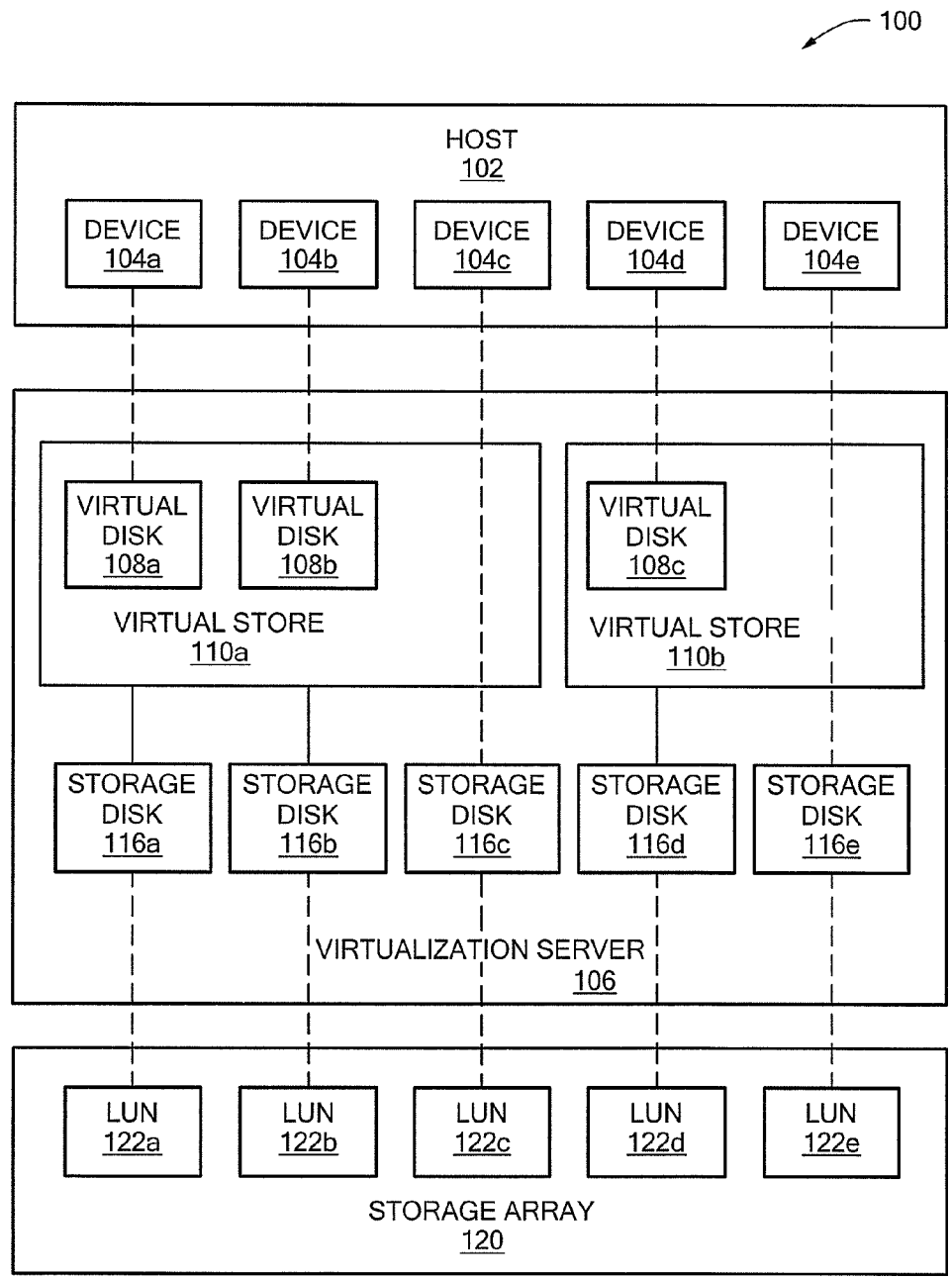
FIG. 1 is a block diagram of a data protection system with virtual stores.

Referring to FIG. 1, a data protection system 100 includes a host 102, a virtualization server 106 and a storage array 120. The host 102 includes devices 104a-104e.

A virtual host is a host that runs an operating system, but is not located on a physical host (i.e., doesn't have its own hardware), but rather is an emulation of a host in the virtualization server 106 (e.g., VMware® VM guest or Hyper-V virtual host). The devices 104a-104e are the disks of the virtual hosts.

The virtualization server 106 includes storage disks 116a-116e and virtual stores 110a, 110b, which include virtual storage disks 108a-108b and virtual storage disk 108c, respectively. In one example, the virtual stores 110a, 110b are each a datastore used in VMware® products. The storage array 120 includes logical units (LUN) 122a-122e.

The virtual disks 108a-108c are exported to the virtual hosts and are mounted as devices 104a-104e. For example, the device 104a is mapped to the virtual disk 108a, the device 104b is mapped to the virtual disk 108b, the device 104c is mapped to the storage disk 116c, also called a raw device mapping (RDM), the device 104d is mapped to the virtual disk 108c and the device 104e is mapped to the storage disk 116e, also called a RDM. When the device 104a saves data to the virtual disk 108a, the device 104a is actually saving data to the storage disk 116a and to storage disk 116b (because the virtual store is built on 116a and 116b) and then the virtual device 108a is built on the virtual store (and may be allocated on one or on both devices); when the device 104b saves data to the virtual disk 108b, the device 104b is actually saving data to the storage disk 116a and/or to 116b and when the device 104d saves data to the virtual disk 108d, the device 104d is actually saving data to the storage disk 116d. Likewise, the LUN 122a is mapped (exported) to the virtualization server 106 and is mounted on the virtualization server 106 as storage disk 116a and the LUN 122b is mapped (exported) to the virtualization server 106 and is mounted on the virtualization server 106 as storage disk 116b.

Figure 2:
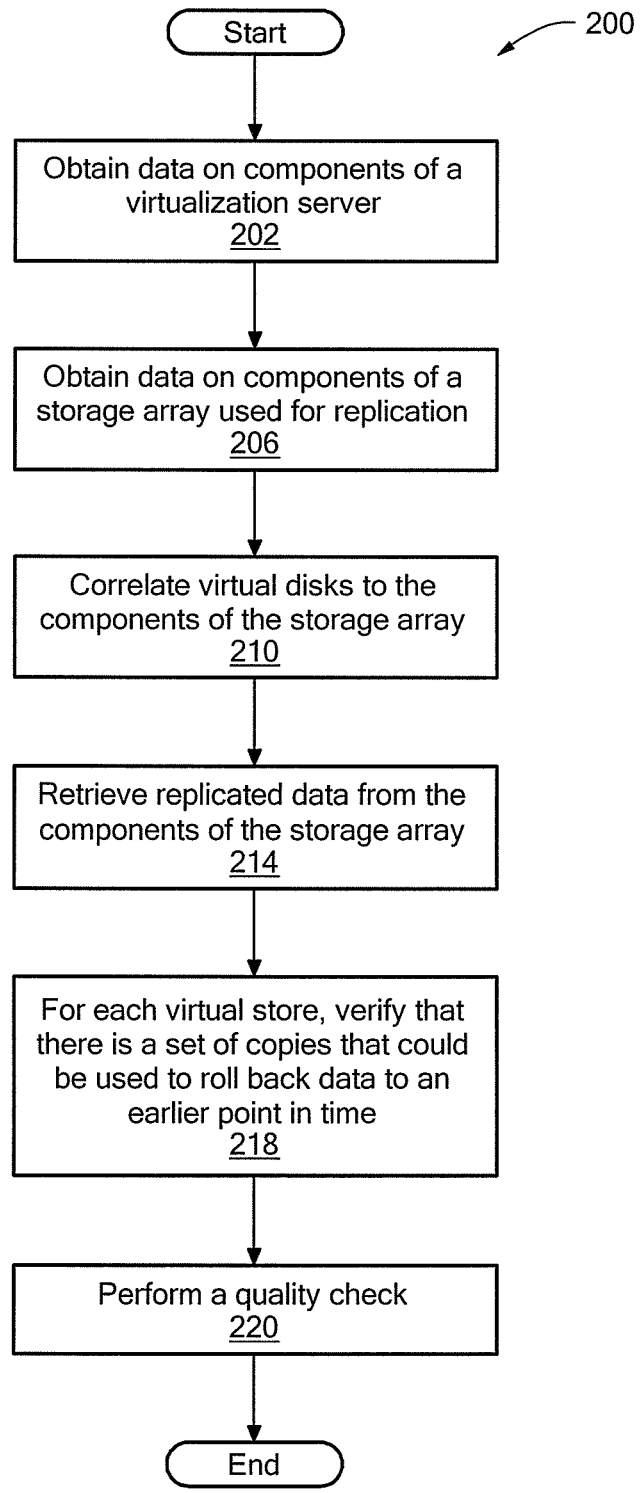
FIG. 2 is a flowchart of an example of a process to roll back data to an earlier point in time for data associated with a virtual store.

Referring to FIG. 2, an example of a process to verifying the ability to roll back data to an earlier point in time for data associated with a virtual store is a process 200. Process 200 obtains data on components of the virtualization server 106 (202). For example, information on the virtual stores 110a, 110b including each name and type. In one example, the following data is retrieved for the virtual stores:

Name—The virtual store name

Datacenter—the virtual environment ID

Type—The virtual store type, such as in VMware® which is called a "VMware® datastore," for example.

In one example, the data is retrieved from the virtualization server 106 or from any management server like in VMware® the V-center (VMware® management server), for example. In addition, the data includes information on the storage disks 116a-116e including their names and types. For example, one type of storage disk is a storage disk that is not linked through a virtual store 110 such as storage disk 116c and 116e (each being called an RDM device). Another type of storage disk is a storage disk that is linked through a virtual store. For example, storage disks 116a, 116b are linked through the virtual store 110a and the storage disk 116d is linked through the virtual store 110b.

Process 200 obtains data on the storage array 120 (206). For example, the data is retrieved from each of the LUNs 122a-122e and includes the mapping to its respective storage disk 116a-116e.

Process 200 correlates virtual disks 108a-108c to components of the storage array 120 (210). For example, after acquiring the mapping from the virtual disks 108a-108c to their respective storage disks 116a, 116b, 116d and the mapping from the LUNs 122a-122e to their respective storage disks 116a-116e, a correlation is performed between virtual disks 108a-108c and their respective LUNs 122a, 122b, 122d.

Process 200 retrieves replicated copies of information stored on the components of the storage array 120 (214). For example, the replicated copies from the LUNs 122a-122e are retrieved (in one example, a LUN 122a-122e can be replicated to another LUN 122a-122e). For example, in order to restore the virtual store 110a, 110b, its required storage disks 116a, 116b, 116d (e.g., all the devices that are not used as RDM) should have a copy from its corresponding LUN 122a, 122b, 122d. That is, the replicated information of the LUNs 122a, 122b, 122d is all that the storage devices 116a, 116b, 116d copies. In one example, a user selects how far back to roll the data is required. In a further example, the user selects which virtual store to roll back and will get the available recovery points.

For each virtual store 110a, 110b selected, process 200 verifies that there is a set of copies that could be used to roll back data to an earlier point in time (218) when needed. For example, for a selected virtual store, the selected virtual store is checked to determine if it has a replica for all the required storage disks mapped to the virtual disks of the selected virtual store. In one particular example, the data on each of the storage disks 116a, 116b mapped to a virtual disk 108a, 108b of the virtual store 110a, is rolled back to an earlier point in time by using the replicated data of LUNs 122a, 122b. In another example, the RDM device, the storage disk 116c is excluded from roll backs because it is not used to build the virtual store. In one particular example, the data is used to validate the ability to roll back using the techniques described in U.S. patent application Ser. No. 11/403,745, filed Apr. 12, 2006 having a U.S. patent Publication No. 2006/0288183 which incorporated herein in its entirety. In one example, the RDM devices, storage disks 116c, 116e are filtered out.

Process 200 performs a quality check (220). For example, each of the virtual disks 108a, 108b of the virtual store 110a is checked to determine if each of the virtual disks 108a, 108b may be rolled back to the earlier point in time. If each of the virtual disks 108a, 108b were not replicated at an earlier point in time, an error message is sent, for example to a user, indicating that the rollback was not completed.

In another example, each of the virtual disks 108a, 108b of the virtual store 110a is checked to determine if the replication/copy was performed correctly and is in a consistent mode. If any of the replicated data on the virtual disks 108a, 108b is not correct, an error message is sent, for example to a user, indicating that the replicated copy for the specific time is incorrect.

In a further example, the replicated data is checked to determine if it was replicated/copied in accordance with a data protection policy. If any of replicated/copied data on the virtual disks 108a, 108b was not done in accordance with a data protection policy, an error message is sent, for example to a user, indicating that there is a compliance problem with the replicated data.

Figure 3:
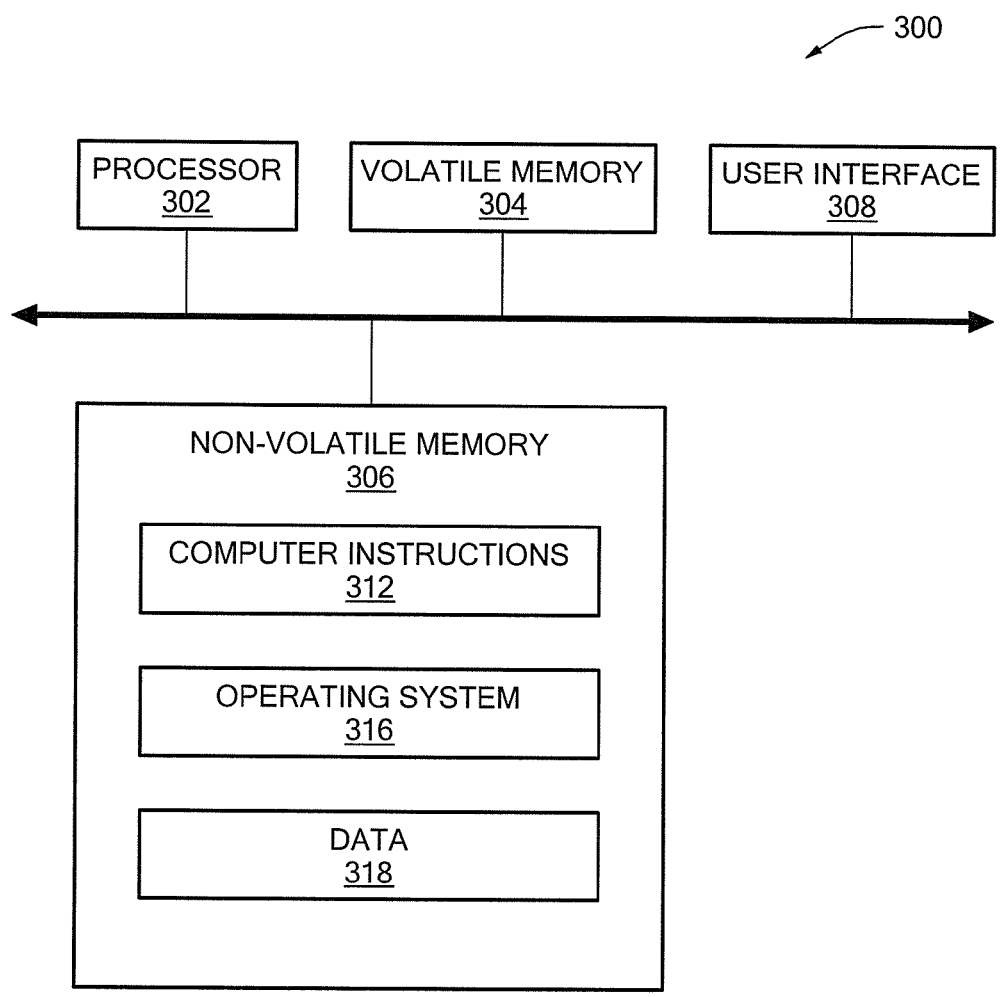
FIG. 3 is a computer on which the process of FIG. 2 may be implemented.

Referring to FIG. 3, a computer includes a processor 302, a volatile memory 304, a non-volatile memory 306 (e.g., hard disk), a graphical user interface (GUI) 308 (e.g., a mouse, a keyboard, a display, for example). The non-volatile memory 306 stores computer instructions 312, an operating system 316 and data 318. In one example, the computer instructions 312 are executed by the processor 302 out of volatile memory 304 to perform all or part of the process 200.

The processes described herein (e.g., the process 200) are not limited to use with the hardware and software of FIG. 3; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information. The system may be implemented, at least in part, via a computer program product, (e.g., in a non-transitory machine-readable storage medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non- volatile memory, volatile memory, magnetic diskette and so forth but does not include a transitory signal per se.

The processes described herein are not limited to the specific examples described. For example, the process 200 is not limited to the specific processing order of FIG. 2. Rather, any of the processing blocks of FIG. 2 may be re-ordered, combined or removed, performed in parallel or in serial, as necessary, to achieve the results set forth above.

The processing blocks in FIG. 2 associated with implementing the system may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method, comprising:
    obtaining data on components of a virtualization server comprising acquiring a mapping of virtual disks in a virtual store to storage disks;
    obtaining data on components of a storage array comprising acquiring a mapping of logical units in the storage array to the storage disks, the logical units replicating data from a corresponding storage disk;
    correlating each virtual disk to a logical unit based on the mapping of the virtual disks to the storage disks and the mapping of the logical units to the storage disks;
    retrieving replication data of the logical units from the storage arrays; and
    for a selected virtual store, checking that the selected virtual store has a replica for all the required storage disks mapped to the virtual disks of the selected virtual store.

2. The method of claim 1 wherein obtaining data on components of a virtualization server further comprises obtaining a name and type of each virtual store.

3. The method of claim 1 wherein obtaining data on components of a virtualization server further comprises obtaining name and type of each storage disk.

4. The method of claim 1 wherein a type of storage disk indicates a storage disk is not mapped to a virtual device.

5. The method of claim 1 wherein checking for a copy comprises not considering a storage disk not mapped to a virtual disk.

6. The method of claim 1, further comprising performing a quality check comprising at least one of:
    examining each of the virtual disks to determine if each of the virtual disks has a replication/copy to the earlier point in time;
    examining all the required of the virtual disks replicas/copies to determine if the replication/copy data is correct and consistent; and
    examining the replications/copies to determine if the protection was performed in accordance with a data protection policy.

7. An article comprising:
    a non-transitory machine-readable medium that stores executable instructions, the instructions causing a machine to:
    obtain data on components of a virtualization server comprising acquiring a mapping of virtual disks in a virtual store to storage disks;
    obtain data on components of a storage array comprising acquiring a mapping of logical units in the storage array to the storage disks, the logical units replicating data from a corresponding storage disk;
    correlate each virtual disk to a logical unit based on the mapping of the virtual disks to the storage disks and the mapping of the logical units to the storage disks;
    retrieve replication data of the logical units from the storage arrays; and
    for a selected virtual store, check that the selected virtual store has a replica for all the required storage disks mapped to the virtual disks of the selected virtual store.

8. The article of claim 7 wherein the instructions causing the machine to obtain data on components of a virtualization server further comprises instructions causing the machine to obtain a name and type of each virtual store.

9. The article of claim 7 wherein the instructions causing the machine to obtain data on components of a virtualization server further comprises instructions causing the machine to obtain name and type of each storage disk.

10. The article of claim 7 wherein a type of storage disk indicates a storage disk is not mapped to a virtual device.

11. The article of claim 7 wherein the instructions causing the machine to check for a copy comprises instructions causing the machine not to consider a storage disk not mapped to a virtual disk.

12. The article of claim 7, further comprising instructions causing the machine to perform a quality check comprising at least one of:
    examining each of the virtual disks to determine if each of the virtual disks has a replication/copy to the earlier point in time;
    examining all the required of the virtual disks replicas/copies to determine if the replication/copy data is correct and consistent; and
    examining the replications/copies to determine if the protection was performed in accordance with a data protection policy.

13. An apparatus, comprising:
    circuitry to:
    obtain data on components of a virtualization server comprising acquiring a mapping of virtual disks in a virtual store to storage disks;
    obtain data on components of a storage array comprising acquiring a mapping of logical units in the storage array to the storage disks, the logical units replicating data from a corresponding storage disk;
    correlate each virtual disk to a logical unit based on the mapping of the virtual disks to the storage disks and the mapping of the logical units to the storage disks;
    retrieve replication data of the logical units from the storage arrays; and
    for a selected virtual store, check that the selected virtual store has a replica for all the required storage disks mapped to the virtual disks of the selected virtual store.

14. The apparatus of claim 13 wherein the circuitry comprises at least one of a processor, a memory, programmable logic and logic gates.

15. The apparatus of claim 13 wherein the circuitry to obtain data on components of a virtualization server further comprises circuitry to obtain a name and type of each virtual store.

16. The apparatus of claim 13 wherein the circuitry to obtain data on components of a virtualization server further comprises circuitry to obtain name and type of each storage disk.

17. The apparatus of claim 13 wherein a type of storage disk indicates a storage disk is not mapped to a virtual device.

18. The apparatus of claim 13 wherein the circuitry to check for a copy comprises instructions causing the machine not to consider a storage disk not mapped to a virtual disk.

19. The apparatus of claim 13, further comprising circuitry to perform a quality check comprising at least one of:

examining each of the virtual disks to determine if each of the virtual disks has a replication/copy to the earlier point in time;

examining all the required of the virtual disks replicas/copies to determine if the replication/copy data is correct and consistent; and examining the replications/copies to determine if the protection was performed in accordance with a data protection policy.

* * * * *